(12) United States Patent
Petrovic et al.

(10) Patent No.: US 11,184,264 B2
(45) Date of Patent: Nov. 23, 2021

(54) ERROR RATE TEST METHOD AND TEST SYSTEM FOR TESTING A DEVICE UNDER TEST

(71) Applicant: Rohde & Schwarz GmbH & Co. KG, Munich (DE)

(72) Inventors: Niels Petrovic, Munich (DE); Meik Kottkamp, Munich (DE); Bledar Karajani, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 0 days.

(21) Appl. No.: 16/797,829

(22) Filed: Feb. 21, 2020

(65) Prior Publication Data
US 2021/0266243 A1    Aug. 26, 2021

(51) Int. Cl.
*H04L 12/26*    (2006.01)
*H04B 17/00*    (2015.01)

(52) U.S. Cl.
CPC ..... *H04L 43/0823* (2013.01); *H04B 17/0085* (2013.01)

(58) Field of Classification Search
CPC ............... H04L 43/0823; H04B 17/0085
See application file for complete search history.

(56) References Cited

U.S. PATENT DOCUMENTS

| | | | |
|---|---|---|---|
| 2005/0063378 A1 | 3/2005 | Kadous | |
| 2006/0002460 A1* | 1/2006 | Maucksch | H04L 1/24 375/227 |
| 2014/0282783 A1* | 9/2014 | Totten | H04B 10/25751 725/111 |

FOREIGN PATENT DOCUMENTS

| | | |
|---|---|---|
| EP | 1502377 B1 | 2/2005 |
| EP | 1635517 A1 | 3/2006 |
| EP | 1665545 A2 | 6/2006 |
| EP | 1692842 A1 | 8/2006 |
| EP | 1735988 A1 | 12/2006 |
| EP | 2622768 A1 | 8/2013 |
| WO | 2005/043862 A1 | 5/2005 |
| WO | 2005/096594 A1 | 10/2005 |
| WO | 2012/044865 A1 | 4/2012 |

* cited by examiner

*Primary Examiner* — Nader Bolourchi
(74) *Attorney, Agent, or Firm* — Christensen O'Connor Johnson Kindness PLLC

(57) ABSTRACT

An error rate test method is disclosed. The error rate test method comprises the following steps. At least one test signal with a predetermined frequency is received from at least one device under test. A symbol sequence comprised in the at least one test signal is determined. At least one error quantity being associated with the at least one device under test and the at least one test signal is determined based on the determined symbol sequence, wherein the at least one error quantity determined is indicative of a rate of erroneous symbols comprised in the symbol sequence. Respective error quantities are determined simultaneously for at least one of multiple devices under test and for multiple different predetermined frequencies. Further, a test system for testing a device under test is disclosed.

16 Claims, 2 Drawing Sheets

ERROR RATE TEST METHOD AND TEST SYSTEM FOR TESTING A DEVICE UNDER TEST

FIELD OF THE DISCLOSURE

Embodiments of the present disclosure relate generally to an error rate test method. Embodiments of the present disclosure further relate to a test system for testing at least one device under test.

BACKGROUND

For characterizing the performance of a device under test, one important measure is the number of symbols that are correctly generated and transferred from the device under test. This measure is also often called bit error rate (BER).

It turned out that the measurement of the bit error rate, which are also called throughput measurements, take a long time if small bit error rates shall be observed, for example bit error rates smaller than $10^{-6}$. This is due to the fact that for measuring a bit error rate smaller than $10^{-n}$, wherein n is an integer bigger than zero, approximately $10^{n+1}$ bits need to be measured, possibly even more in order to achieve a statistically sound result.

Thus, the measurement duration scales exponentially with n, which results in very long measurement durations for small bit error rates that are to be measured.

Accordingly, there is a need for fast and reliable possibility to perform throughput measurements.

SUMMARY

Embodiments of the present disclosure provide an error rate test method. In an embodiment, the error rate test method comprises the following steps. At least one test signal with a predetermined frequency is received from at least one device under test. A symbol sequence comprised in the at least one test signal is determined. At least one error quantity being associated with the at least one device under test and the at least one test signal is determined based on the determined symbol sequence, wherein the at least one error quantity determined is indicative of a rate of erroneous symbols comprised in the symbol sequence. Respective error quantities are determined simultaneously for at least one of multiple devices under test and for multiple different predetermined frequencies.

The error rate test method according to the disclosure is based on the idea to parallelize the error rate testing in two different ways. More precisely, the error rate test method according to the disclosure allows for testing multiple devices under test and/or multiple different predetermined frequencies at the same time, for instance multiple different predetermined frequency bands. In other words, a single frequency may be tested simultaneously for multiple devices under test, multiple different frequencies may be simultaneously tested for a single device under test, and/or multiple different frequencies may be simultaneously tested for multiple devices under test.

Accordingly, the time needed for performing the error rate test is significantly reduced compared to performing the individual tests consecutively.

In the context of this disclosure, the term "multiple" is understood to mean "at least two". Accordingly, the term "multiple devices under test" denotes two or more devices under test. Similarly, the term "multiple different predetermined frequencies" denotes two or more predetermined frequencies that are different from each other. In addition, it is to be noted that the predetermined frequencies are different by intention.

The at least one test signal may be received from the at least one device under test over the air (OTA), i.e. in the form of an electromagnetic wave signal propagating over the air. In other words, the test signal may be a radio signal. Alternatively or additionally, the at least one test signal may be received via a wire-based connection, for example via a cable.

Generally speaking, the at least one device under test may be approved or rejected based on the determined error quantity. In other words, the at least one error quantity serves as a measure that is indicative of a performance of the device under test. More precisely, the at least one error quantity is indicative of a rate of erroneous symbols in the at least one test signal.

For example, the at least one device under test may be rejected if a value of the determined error quantity exceeds a certain threshold value, i.e. if the rate of erroneous symbols in the at least one test signal is too high.

Similarly, the at least one device under test may be approved if a value of the determined error quantity is below the threshold value, i.e. if the rate of erroneous symbols is within a range that is deemed to be acceptable.

The symbol sequence comprised in the at least one test signal may be generated by the device under test according to a predefined test protocol. In other words, the device under test may be controlled to enter a test mode, in which the device under test generates a predefined test signal comprising a predefined symbol sequence.

According to one aspect of the present disclosure, the at least one error quantity determined comprises at least one of a bit error ratio, a block error ratio, and a frame error ratio. Accordingly, a ratio of erroneous bits to the total number of transmitted bits, a ratio of erroneous blocks to the total number of transmitted blocks and/or a ratio of erroneous frames to the total number of transmitted frames is determined.

In the context of the present disclosure, the term "bit error ratio" is understood to comprise the meaning "symbol error ratio" if the received test signal is not a binary one. For example, the test signal may be PAM-N coded, wherein N is an integer bigger than 2. In this case, the "bit error ratio" is the ratio of erroneous symbols to the total number of transmitted symbols.

According to another aspect of the present disclosure, multiple test signals are received, each having a different predetermined frequency, wherein the different predetermined frequencies are each associated with a (frequency) sub-band of the at least one device under test. Accordingly, multiple sub-bands of the at least one device under test are tested simultaneously and the measurement time needed for testing all sub-bands is reduced. This is particularly useful for devices under test that are configured to communicate on multiple frequency bands at the same time, which is quite common for contemporary mobile communication standards such as LTE, 4G and 5G.

In an embodiment of the present disclosure, an individual error quantity is determined for each of the multiple test signals. In other words, each frequency sub-band employed by the at least one device under test is tested and an individual error quantity is determined for each of these frequency sub-bands. Thus, the performance of the at least one device under test in each of these sub-bands is evaluated by determining the individual error quantities.

Accordingly, the at least one device under test may be approved or rejected based on one or several of the individual error quantities.

In some examples, the device under test may be rejected if the value of a single one of the individual error quantities exceeds a certain threshold value, i.e. if the rate of erroneous symbols in the at least one test signal is too high in one of the frequency sub-bands.

Similarly, the at least one device under test may be approved if the respective value of the determined individual error quantities is below the threshold value, i.e. if the rate of erroneous symbols is within a range that is deemed to be acceptable in all of the frequency sub-bands.

In a further embodiment of the present disclosure, the individual error quantities are combined in order to determine a combined error quantity. In other words, the individual error quantities are converted into a single error quantity, namely the combined error quantity. This way, a simple measure for the performance of the device under test is obtained that is easy to understand.

In some examples, the at least one error quantity is determined repeatedly for consecutive portions of the symbol sequence of the at least one test signal, thereby determining a preliminary error quantity. Thus, the individual portions of the symbol sequence may be analyzed before the complete symbol sequence has been received. Accordingly, a (preliminary) measure for the performance of the device under test can be obtained even before the complete symbol sequence is received.

One possible method for determining the preliminary error quantity is disclosed in the European patent application EP 1 502 377 B1, which disclosure concerning the method for determining the preliminary error quantity is hereby incorporated in its entirety by reference.

In some examples, all previously received portions of the symbol sequence may be taken into account for determining the preliminary error quantity. Thus, the performance of the device under test is continuously monitored by continuously updating the preliminary error quantity.

According to a further aspect of the present disclosure, the preliminary error quantity is evaluated statistically based on at least one early decision criterion. In other words, the preliminary error quantity may be taken into account for the decision whether the device under test is approved or rejected. Thus, a decision to approve or reject the respective device under test may be made before the complete symbol sequence comprised in the test signal is analyzed. This way, measurement time is saved because part of the test procedure may be skipped if the result is known before the end of the test procedure.

In some examples, the early decision criterion comprises at least one of an early pass criterion and an early fail criterion. Thus, the at least one device under test may be approved or rejected before the complete symbol sequence comprised in the test signal is analyzed. Thus, the performance of the device under test is continuously monitored in view of the early pass criterion and/or the early fail criterion, and a decision to approve and/or reject the device under test may be made at any time during the test procedure if the early pass criterion and/or the early fail criterion is met.

According to an aspect of the present disclosure, the early decision criterion is constructed such that it may be wrong at most with a predefined probability. In some examples, the probability of the early decision criterion being wrong is smaller than the probability of a final decision being wrong at the end of the complete test procedure.

In some examples, testing of the device under test is stopped early if the early decision criterion is met. Thus, the remaining part of the test procedure for the device under test is not performed if the early decision criterion is met. Thus, the error rate test method according to the disclosure takes less time than comparable error rate test methods where the complete test procedure is performed and a decision to approve or reject the device under test is taken afterwards.

Embodiments of the present disclosure further provide a test system for testing at least one device under test. The test system comprises a receiver module, such as a receiver or receiver circuit, and an analysis module, such as an analyzer or analysis circuit. The receiver module is configured to receive at least one test signal having a predetermined frequency from at least one device under test. The analysis module is configured to determine a symbol sequence comprised in the at least one test signal. The analysis module is configured to determine at least one error quantity being associated with the at least one device under test and the at least one test signal based on the determined symbol sequence, wherein the at least one error quantity determined is indicative of a rate of erroneous symbols comprised in the symbol sequence. Respective error quantities are determined simultaneously for at least one of multiple devices under test and for multiple different predetermined frequencies.

Therein and in the following, the term "module" is understood to denote software, hardware, or a combination of software and hardware, such as circuitry, as may be appropriate in the case at hand. For example, the "receiving module" may comprise hardware means like an antenna and/or a radio frequency (RF) frontend in order to receive radio frequency (RF) signals, while the "analysis module" may comprise software that is configured to perform the steps described above. Alternatively or additionally, the analysis module may comprise hardware such as FPGAs, DSPs, or ASICs that are configured to perform at least some of the steps described above.

In some examples, the test system is configured to perform the error test method described above.

Regarding the advantages and further properties of the test system, reference is made to the explanations given above regarding the error rate test method, which also hold for the test system and vice versa.

Generally speaking, the analysis module may be configured to approve or reject the at least one device under test based on the determined error quantity. In other words, the at least one error quantity serves as a measure that is indicative of a performance of the device under test. More precisely, the at least one error quantity is indicative of a rate of erroneous symbols in the at least one test signal.

For example, the at least one device under test may be rejected if a value of the determined error quantity exceeds a certain threshold value, i.e. if the rate of erroneous symbols in the at least one test signal is too high.

Similarly, the at least one device under test may be approved if a value of the determined error quantity is below the threshold value, i.e. if the rate of erroneous symbols is within a range that is deemed to be acceptable.

According to an embodiment of the present disclosure, the test system comprises multiple devices under test, wherein the analysis module is configured to simultaneously determine a separate error quantity for each of the multiple devices under test, respectively. Thus, the multiple devices under test are tested at the same time, but without influencing one another as a separate error quantity id determined for each one of the multiple devices under test. This way, the time needed for testing the devices under test is reduced because the testing of the multiple devices under test is parallelized.

According to another aspect of the present disclosure, the receiving module is configured to simultaneously receive multiple test signals each having a different predetermined frequency, wherein the different predetermined frequencies are each associated with a sub-band of the at least one device under test. Accordingly, multiple sub-bands of the at least one device under test are tested simultaneously and the measurement time needed for testing all sub-bands is reduced. This is particularly useful for devices under test that are configured to communicate on multiple frequency bands at the same time, which is quite common for contemporary mobile communication standards such as LTE, 4G and 5G.

The analysis module may be configured to determine an individual error quantity for each of the multiple test signals. In other words, each frequency sub-band employed by the at least one device under test is tested and an individual error quantity is determined for each of these frequency sub-bands. Thus, the performance of the at least one device under test in each of these sub-bands is evaluated by determining the individual error quantities.

Accordingly, the at least one device under test may be approved or rejected based on one or several of the individual error quantities.

For example, the device under test may be rejected if the value of a single one of the individual error quantities exceeds a certain threshold value, i.e. if the rate of erroneous symbols in the at least one test signal is too high in one of the frequency sub-bands.

Similarly, the at least one device under test may be approved if the respective value of tall of he determined individual error quantities is below the threshold value, i.e. if the rate of erroneous symbols is within a range that is deemed to be acceptable in all of the frequency sub-bands.

In some examples, the analysis module is configured to determine a combined error quantity based on the determined individual error quantities. In other words, the individual error quantities are converted into a single error quantity, namely the combined error quantity. This way, a simple measure for the performance of the device under test is obtained that is easy to understand.

The determined error quantity may comprise at least one of a bit error ratio, a block error ratio, and a frame error ratio. Accordingly, a ratio of erroneous bits to the total number of transmitted bits, a ratio of erroneous blocks to the total number of transmitted blocks and/or a ratio of erroneous frames to the total number of transmitted frames is determined.

According to an aspect of the present disclosure, the analysis module is configured to determine the at least one error quantity repeatedly for consecutive portions of the symbol sequence of the at least one test signal, thereby determining a preliminary error quantity.

In a further embodiment of the present disclosure, the analysis module is configured to evaluate the preliminary error quantity statistically based on at least one early decision criterion. Thus, a decision to approve or reject the respective device under test may be made before the complete symbol sequence comprised in the test signal is analyzed. This way, measurement time is saved because part of the test procedure may be skipped if the result is known before the end of the test procedure.

In some examples, the early decision criterion comprises at least one of an early pass criterion and an early fail criterion. Thus, the at least one device under test may be approved or rejected before the complete symbol sequence comprised in the test signal is analyzed. Thus, the performance of the device under test is continuously monitored in view of the early pass criterion and/or the early fail criterion, and a decision to approve and/or reject the device under test may be made at any time during the test procedure if the early pass criterion and/or the early fail criterion is met.

According to another aspect of the present disclosure, the early decision criterion is constructed such that it may be wrong at most with a predefined probability. In some examples, the probability of the early decision criterion being wrong is smaller than the probability of a final decision being wrong at the end of the complete test procedure.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
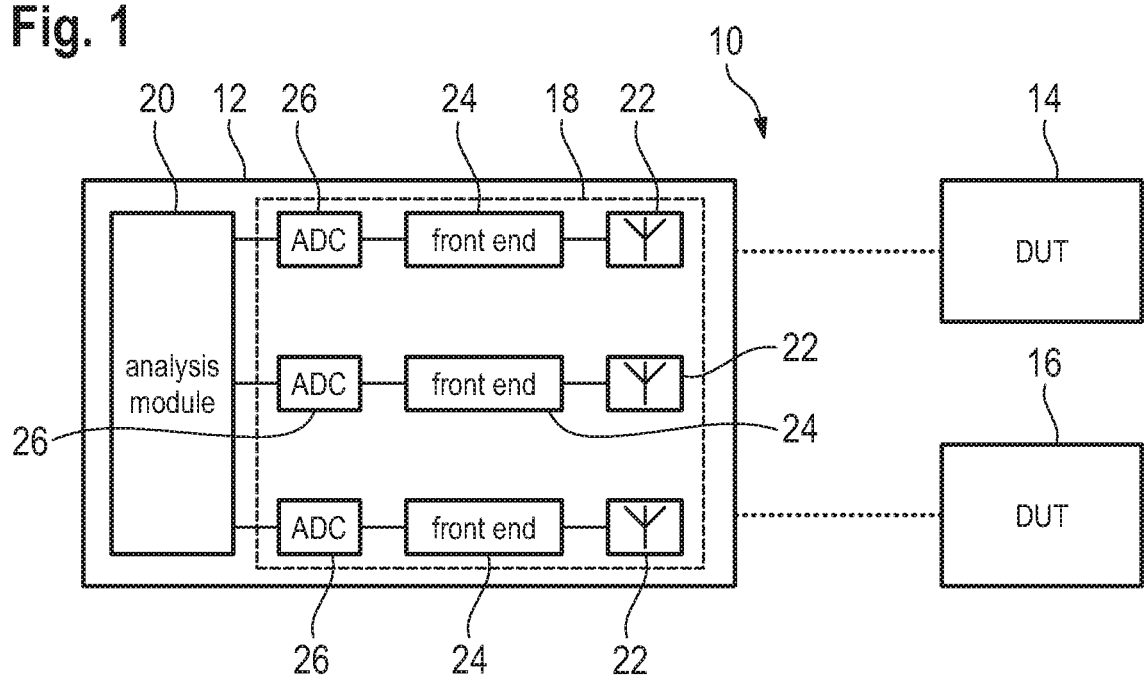
FIG. 1 schematically shows a block diagram of an example test system according to an embodiment of the disclosure.

FIG. 1 schematically shows a test system 10 with a measurement device 12, a first device under test 14 and a second device under test 16. The measurement device 12 may be established as an oscilloscope, as a vector network analyzer and/or as any other type of measurement device that is suitable for performing the measurements described below and/or carry out the methodology or technology of the present disclosure, or portions thereof.

In the particular embodiment shown in FIG. 1, the devices under test 14, 16 are each established as radio frequency (RF) devices. In other words, the devices under test 14, 16 each are configured to generate and transmit RF signals. For example, the devices under test 14, 16 may be established as mobile communication devices, such as smartphones or tablets, in some embodiments. Thus, the devices under test 14, 16 may be configured to communicate based on a contemporary mobile communication standard such as 2G, 3G, LTE, 4G, and/or 5G. As a further example, the devices under test 14, 16 may be established as RF antenna units or as devices comprising RF antenna units.

However, it is to be understood that the explanations given in the following also apply to test systems 10 where the devices under test 14, 16 are configured to generate electrical signals. In this case, the devices under test 14, 16 may be connected to the measurement device 12 via a wire-based connection.

The measurement device 12 comprises a receiver circuit or module 18 and an analysis circuit or module 20 that are connected with each other in a signal transmitting manner.

Generally speaking, the receiver module 18 is configured to receive radio frequency (RF) signals. The receiver module 18 may comprise one or several antennas 22 and respectively associated RF front ends 24, wherein each one of the RF front ends 24 may be associated with one of the antennas 22. The antennas 22 may be integrated into the measurement device 12 or may be external antennas that are connected to the measurement device 12 in a signal transmitting manner, for example via a wire-based connection.

Optionally, the receiver module 18 comprises at least one analog-to-digital converter 26, for example several analog-to-digital converters 26. Each of the analog-to-digital converters 26 may be connected to at least one of the RF front ends 24.

Figure 2:
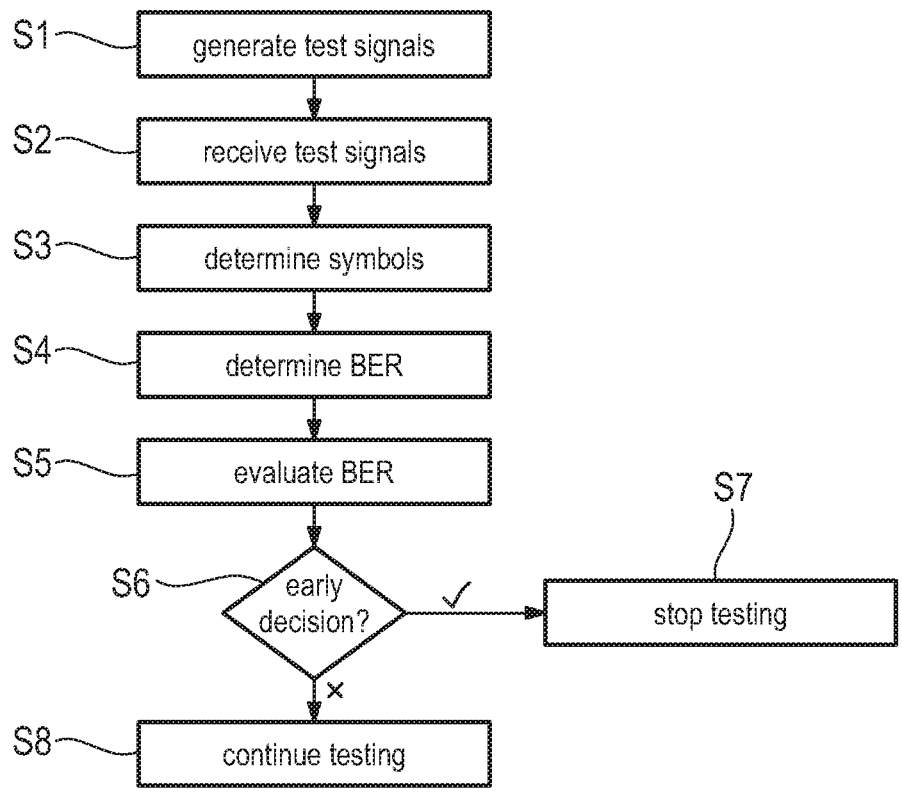
FIG. 2 shows a block diagram of an example error test method according to an embodiment of the disclosure.

Generally speaking, the test system 10 or rather the measurement device 12 is configured to test the devices under test 14, 16 by receiving test signals from the devices under test 14, 16 and by evaluating the test signals according to certain criteria. More precisely, the test system is configured to perform an error rate test method described in the following with reference to FIG. 2.

Without restriction of generality, the case of over the air (OTA) testing of the devices under test 14, 16 will be described in the following. However, the explanations given below also apply, possibly with suitable minor changes, to the case where the devices under test 14, 16 are connected to the measurement device 12 via a wire-based connection.

Test signals are generated by the devices under test 14, 16 (step S1). The test signals are transmitted to the measurement device 12, as is indicated by the dotted lines in FIG. 1. More precisely, multiple test signals are generated by each of the devices under test 14, 16. The multiple test signals generated by each of the devices under test 14, 16 are associated with different frequency sub-bands employed by the respective device under test 14, 16.

In other words, each of the devices under test 14, 16 generates multiple signals. The first device under test 14 generates multiple test signals, wherein each of these test signals is associated with one of the frequency sub-bands $F_{a1}, F_{a2}, \ldots, F_{aN}$ of the first device under test 14. Similarly, the second device under test 16 generates multiple test signals, wherein each of these test signals is associated with one of the frequency sub-bands $F_{b1}, F_{b2}, \ldots, F_{bN}$ of the second device under test 16.

Therein, the individual frequency sub-bands of each device under test 14, 16 are different from each other, i.e. $F_{ai} \neq F_{aj}$ for $i \neq j$ and $F_{bi} \neq F_{bj}$ for $i \neq j$. However, the sub-bands of the devices under test 14, 16 may at least partially match each other, i.e. $F_{ai} = F_{bj}$ for arbitrary i,j is allowed.

The test signals may each be generated according to a predefined test protocol. Thus, the symbol sequences comprised in the test signals may be predetermined, such that the symbol sequences are known.

The devices under test 14, 16 may be controlled to enter a certain test mode in order to generate the test signals. In some examples, the devices under test 14, 16 may be controlled by the measurement device 12 to enter the test mode.

The test signals are then received by the receiver module 18 (step S2). More precisely, the test signals are received by the antennas 22 and may be preprocessed by the respective front end 24 and/or the respective ADC 26. In some examples, the test signals are down-converted and/or filtered by the front end 24. Moreover, the test signals may be digitized by the ADCs 26.

The received test signals are then forwarded to the analysis module 20 for further analysis. The analysis module 20 determines a respective symbol sequence comprised in each of the multiple test signals (step S3).

Based on the determined symbol sequences, the analysis module 20 determines an individual error quantity for each of the multiple test signals (step S4). In general, the error quantities are indicative of a rate of erroneous symbols comprised in the respective symbol sequence.

The error quantity may comprise a bit error ratio, a block error ratio and/or a frame error ratio. Accordingly, a ratio of erroneous bits to the total number of transmitted bits, a ratio of erroneous blocks to the total number of transmitted blocks and/or a ratio of erroneous frames to the total number of transmitted frames is determined for each of the multiple test signals.

In some examples, the analysis module 20 compares the symbol sequences to the respective symbol sequences that are predetermined by the test protocol in order to determine the individual error quantities.

Figure 3:
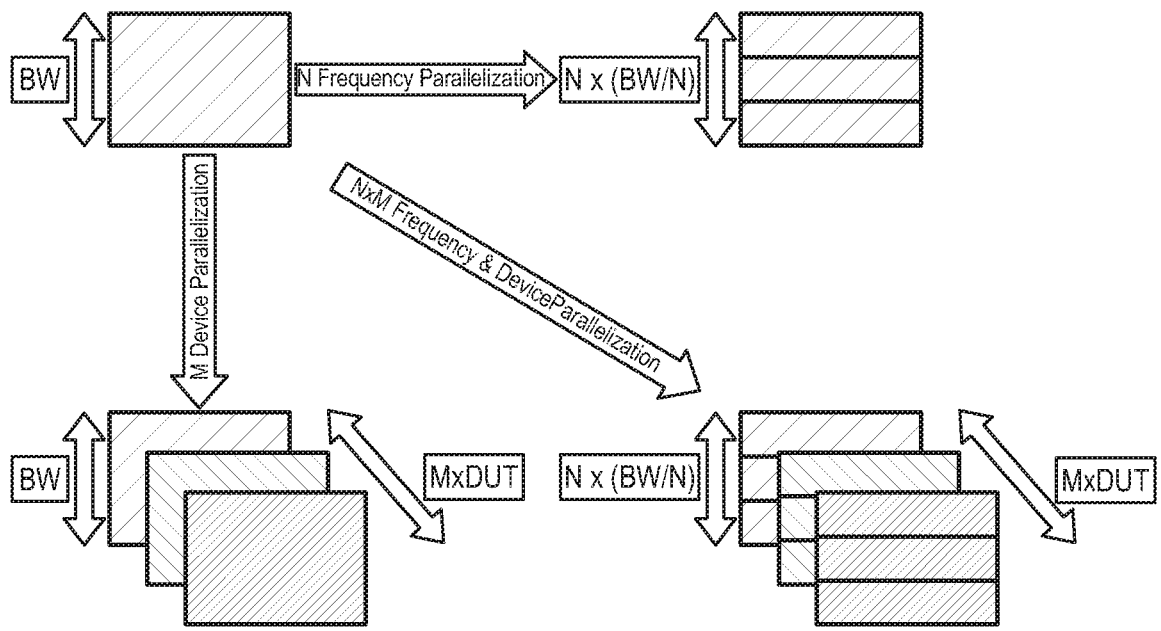
FIG. 3 schematically illustrates the principle of parallelization employed by the test system and the method according to one or more embodiments of the disclosure.

As is illustrated in FIG. 3, the individual error quantities are determined in a highly parallel fashion. On one hand, the individual error quantities are determined simultaneously for all devices under test 14, 16, which is indicated by the box "M×DUT" in the lower left portion of FIG. 3.

On the other hand, the individual error quantities are determined simultaneously for all of the sub-bands of the individual devices under test, which is indicated by the box "N×(BW/N)" in the upper right portion of FIG. 3.

Thus, a parallelization in both the devices under test 14, 16 and in the frequency sub-bands is achieved, as is illustrated in the lower right portion of FIG. 3.

In step S4, the individual error quantities are determined repeatedly for consecutive portions of the respective test signal. In the following, this is explained in more detail for one particular test signal comprising a symbol sequence $a_n$. It is to be understood that the remaining test signals are analyzed in the same way.

At a given time $t_0$, the first $N_0$ symbols of the symbol sequence $a_n$ have been received. Based on these first $N_0$ symbols, a preliminary error quantity $e_0$ is determined.

At a time $t_1$ that is later than $t_0$, a total number $N_1$ of symbols has been received that is bigger than $N_0$. Based on these $N_1$ symbols, an updated preliminary error quantity $e_1$ is determined. Therein, the updated preliminary error quantity $e_1$ may be determined based on the preliminary error quantity $e_0$ and on the $(N_1 - N_0)$ new symbols, or directly based on the $N_1$ symbols. This is repeated several times.

In some examples, an updated preliminary error quantity is determined each time an erroneous symbol is detected.

Thus, the individual error quantities are constantly monitored and updated by determining the respective preliminary error quantities as described above.

The preliminary error quantities are evaluated statistically in view of at least one early decision criterion (step S5).

Generally, the preliminary error quantities are each tested against an early pass criterion and against an early fail criterion. One possible way of doing this is disclosed in EP 1 502 377 B1. The respective way for determining the preliminary error quantity disclosed in this patent is incorporated in its entirety by reference.

The early decision criteria are each constructed such that they may respectively be false at most with a certain predefined probability $D_i$. In some examples, the probabilities $D_i$ are each chosen to be smaller than a wrong decision probability P, which is the probability for the conclusion of the entire testing procedure to be wrong.

The probabilities $D_i$ may be chosen to be equal to or smaller than 1%, for example equal to or smaller than 0.5%, for example equal to or smaller than 0.2%.

In the following, the example of the error quantity being the bit error ratio is discussed. However, the explanations given in the following apply mutatis mutandis to other types of error quantities, for example to block error ratios and frame error ratios.

Generally, for each device under test 14, 16 and for each frequency sub-band, the following two equations are solved:

$$D_1 = \int_0^{n_e} PD_{high}(NE_{high}, ni) dni, \text{ and}$$

$$D_2 = \int_{n_e}^{\infty} PD_{low}(NE_{low}, ni) dni.$$

Therein, ne is the number of erroneous bits detected so far, NE denotes the mean value of erroneous bits, such that NE/ns is the actual bit error ratio of the respective one of the devices under test 14, 16, and PD denotes a probability distribution characterizing the distribution of ni erroneous bits in a sample of fixed length.

More precisely, $PD_{high}(NE_{high}, ni)$ denotes the worst possible distribution with variable ni, while $PD_{low}(NE_{low}, ni)$ denotes the best possible distribution.

The probability distribution PD may be a Poisson-distribution, wherein $n_i$ is the variable of the distribution.

For $D_1 = D_2 = D$ and $C = 1 - D$, and PD being a Poisson-distribution, $NE_{high}$ and $NE_{low}$ can be obtained can be obtained from the $\chi^2$-distribution, namely by employing the following equations:

$$NE_{low} = \tfrac{1}{2} qchisq(D, 2 \cdot n_e), \text{ and}$$

$$NE_{high} = \tfrac{1}{2} qchisq(C, 2(n_e + 1)).$$

Moreover, the difference range between $NE_{high}$ and $NE_{low}$ is defined to be the confidence range CR.

If the entire confidence range CR, calculated from a single result ne, is found on the "good side" ($NE_{limit} > NE_{high}$) of the specified limit $NE_{limit}$ one can conclude: With high probability C (because D is small), the final result NE is better than a specified limit $NE_{limit}$, wherein $NE_{limit}$ is given by $$NE_{limit} = BER_{limit} \cdot ns,$$

and wherein $BER_{limit}$ is the bit error ratio allowable for the respective device under test 14, 16 and obtained by an ideal long test with an infinite high number of bit samples ns.

Conversely, if the entire confidence range CR, calculated from a single result ne, is found on the "bad side" ($NE_{limit} < NE_{low}$) of the specified limit $NE_{limit}$ one can conclude: With high probability C, the final result NE is worse than the limit $NE_{limit}$.

Accordingly, an early decision on whether to approve or reject the device under test may be taken if the confidence range CR is on either the good side or the bad side of the specified limit $NE_{limit}$ (step S6).

Figure 4:
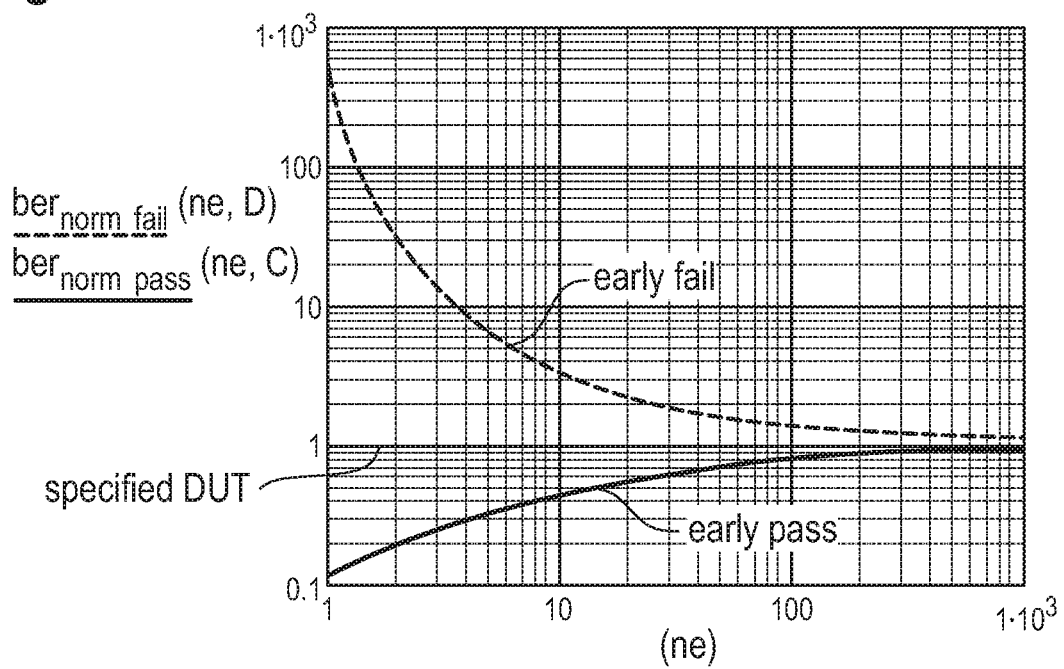
FIG. 4 shows a diagram of bit error distributions respectively plotted against measured bit errors.

More precisely, as it is illustrated in FIG. 4 for a single device under test and a single frequency sub-band, the respective device under test 14, 16 is approved early, if the confidence range CR is on the good side of the specified limit for all error quantities associated with that device under test 14, 16, i.e. for all frequency sub-ranges of that device under test 14, 16.

This means, that the respective one of the devices under test 14, 16 may not be approved early if the confidence range CR associated with only one of the frequency sub-ranges is not entirely on the good side.

However, if the confidence range CR associated with only one of the frequency sub-ranges is entirely on the bad side of the specified limit, the respective one of the devices under test 14, 16 may be rejected early.

In other words, the devices under test 14, 16 may be rejected early if they fail at one or more of their respective frequency sub-ranges, but are only approved early if they pass at all of their respective frequency sub-ranges simultaneously.

Alternatively to treating the individual error quantities separately from one another as described above, the individual error quantities may be combined in order to determine a combined error quantity. Step S6 described above may then be performed for the combined error quantity.

If one of the devices under test 14, 16 is approved or rejected early, testing of that device under test 14, 16 is stopped (step S7).

If, however, at least one of the devices under test 14, 16 is not approved or rejected early, the testing procedure is continued until a predefined number of symbols is received and analyzed, after which an end-of-test decision is taken to approve or reject the respective device under test 14, 16 according to predefined criteria (step S8).

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An error rate test method, said method comprising:
receiving at least one test signal with a predetermined frequency from at least one device under test;
determining a symbol sequence comprised in said at least one test signal; and
determining at least one error quantity being associated with said at least one device under test and said at least one test signal based on said determined symbol sequence;
wherein said at least one error quantity determined is indicative of a rate of erroneous symbols comprised in said symbol sequence, and
wherein respective error quantities are determined simultaneously for at least one of multiple devices under test and for multiple different predetermined frequencies,
wherein said at least one error quantity is determined repeatedly for consecutive portions of the symbol sequence of the at least one test signal, thereby determining a preliminary error quantity, and
wherein said preliminary error quantity is evaluated statistically based on at least one early decision criterion.

2. The error rate test method of claim 1, wherein said at least one error quantity determined comprises at least one of a bit error ratio, a block error ratio, and a frame error ratio.

3. The error rate test method of claim 1, wherein multiple test signals each having a different predetermined frequency are received, wherein said different predetermined frequencies are each associated with a sub-band of said at least one device under test.

4. The error rate test method of claim 3, wherein an individual error quantity is determined for each of said multiple test signals.

5. The error rate test method of claim 4, wherein said individual error quantities are combined in order to determine a combined error quantity.

6. The error rate test method of claim 1, wherein said at least one early decision criterion comprises at least one of an early pass criterion and an early fail criterion.

7. The error rate test method of claim 1, wherein said at least one early decision criterion is constructed such that it may be wrong at most with a predefined probability.

8. The error rate test method of claim 1, wherein testing of said at least one device under test is stopped early if said at least one early decision criterion is met.

9. A test system for testing at least one device under test, said test system comprising a receiver circuit and an analysis circuit,
said receiver circuit being configured to receive at least one test signal having a predetermined frequency from at least one device under test,
said analysis circuit being configured to determine a symbol sequence comprised in said at least one test signal, and
said analysis circuit being configured to determine at least one error quantity being associated with said at least one device under test and said at least one test signal based on said determined symbol sequence,
wherein said at least one error quantity determined is indicative of a rate of erroneous symbols comprised in said symbol sequence, and
wherein respective error quantities are determined simultaneously for at least one of multiple devices under test and for multiple different predetermined frequencies,
wherein the receiving circuit is configured to simultaneously receive multiple test signals each having a different predetermined frequency, wherein said different predetermined frequencies are each associated with a sub-band of said at least one device under test, and
wherein said analysis circuit is configured to determine an individual error quantity for each of said multiple test signals simultaneously.

10. The test system of claim 9, wherein said test system comprises multiple devices under test, and wherein said analysis circuit is configured to simultaneously determine a separate error quantity for each of the multiple devices under test, respectively.

11. The test system of claim 9, wherein said analysis circuit is configured to determine a combined error quantity based on said determined individual error quantities.

12. The test system of claim 9, wherein said at least one determined error quantity comprises at least one of a bit error ratio, a block error ratio, or a frame error ratio.

13. The test system of claim 9, wherein said analysis circuit is configured to determine said at least one error quantity repeatedly for consecutive portions of the symbol sequence of said at least one test signal, thereby determining a preliminary error quantity.

14. The test system of claim 13, wherein said analysis circuit is configured to evaluate said at least one preliminary error quantity statistically based on at least one early decision criterion.

15. The test system of claim 14, wherein said at least one early decision criterion comprises at least one of an early pass criterion or an early fail criterion.

16. The test system of claim 14, wherein said at least one early decision criterion is constructed such that it may be wrong at most with a predefined probability.

* * * * *